Oct. 17, 1939.    J. V. CAPUTO    2,176,656
METHOD AND APPARATUS FOR WELDING
Original Filed March 14, 1934    4 Sheets-Sheet 1
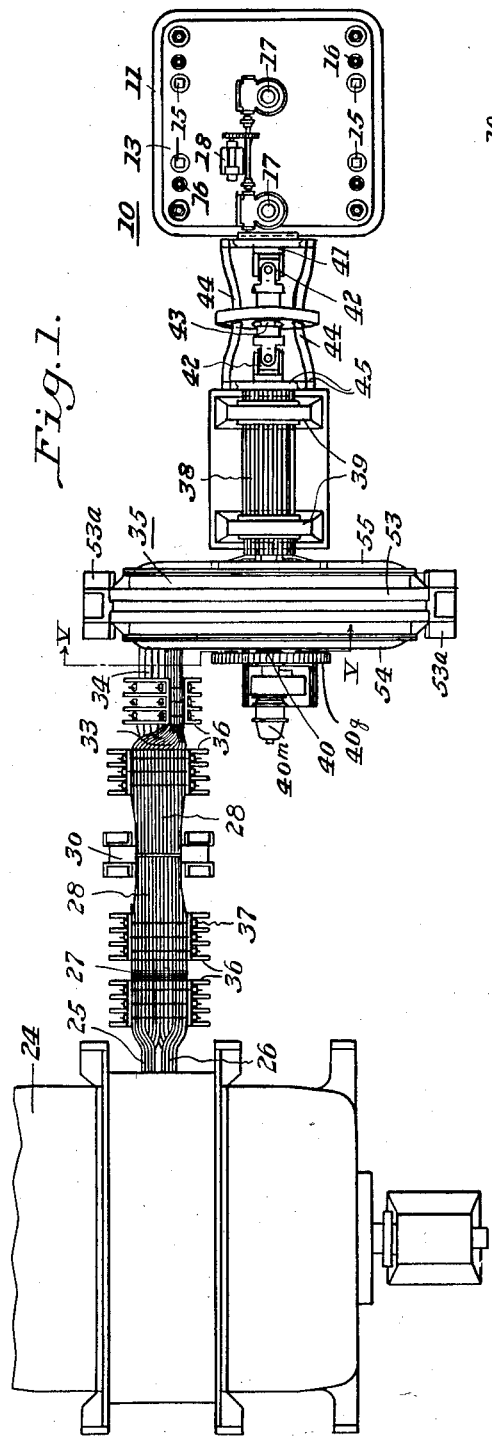
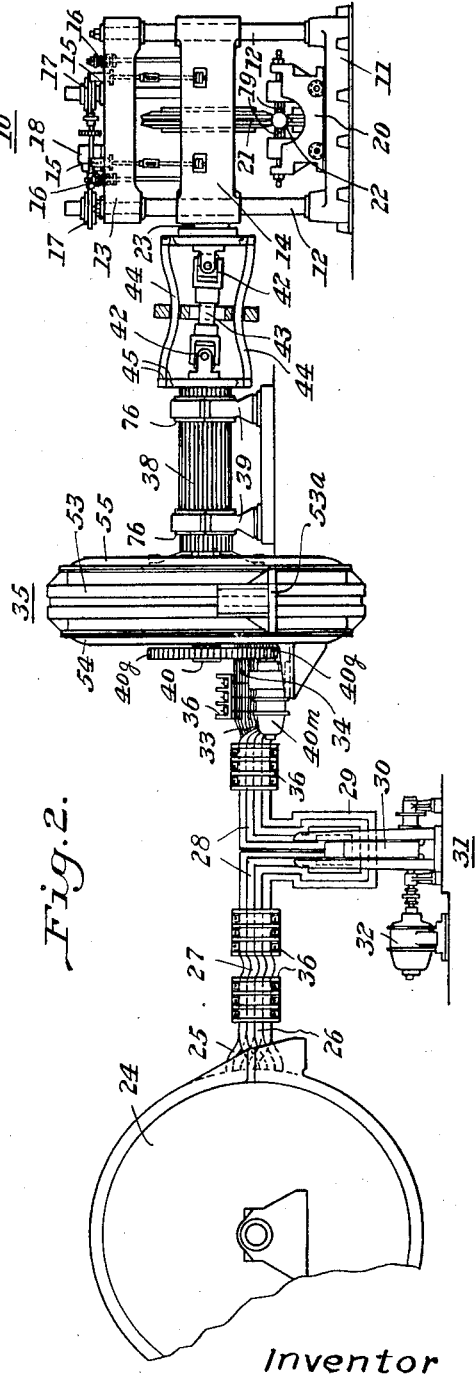
Inventor
James V. Caputo

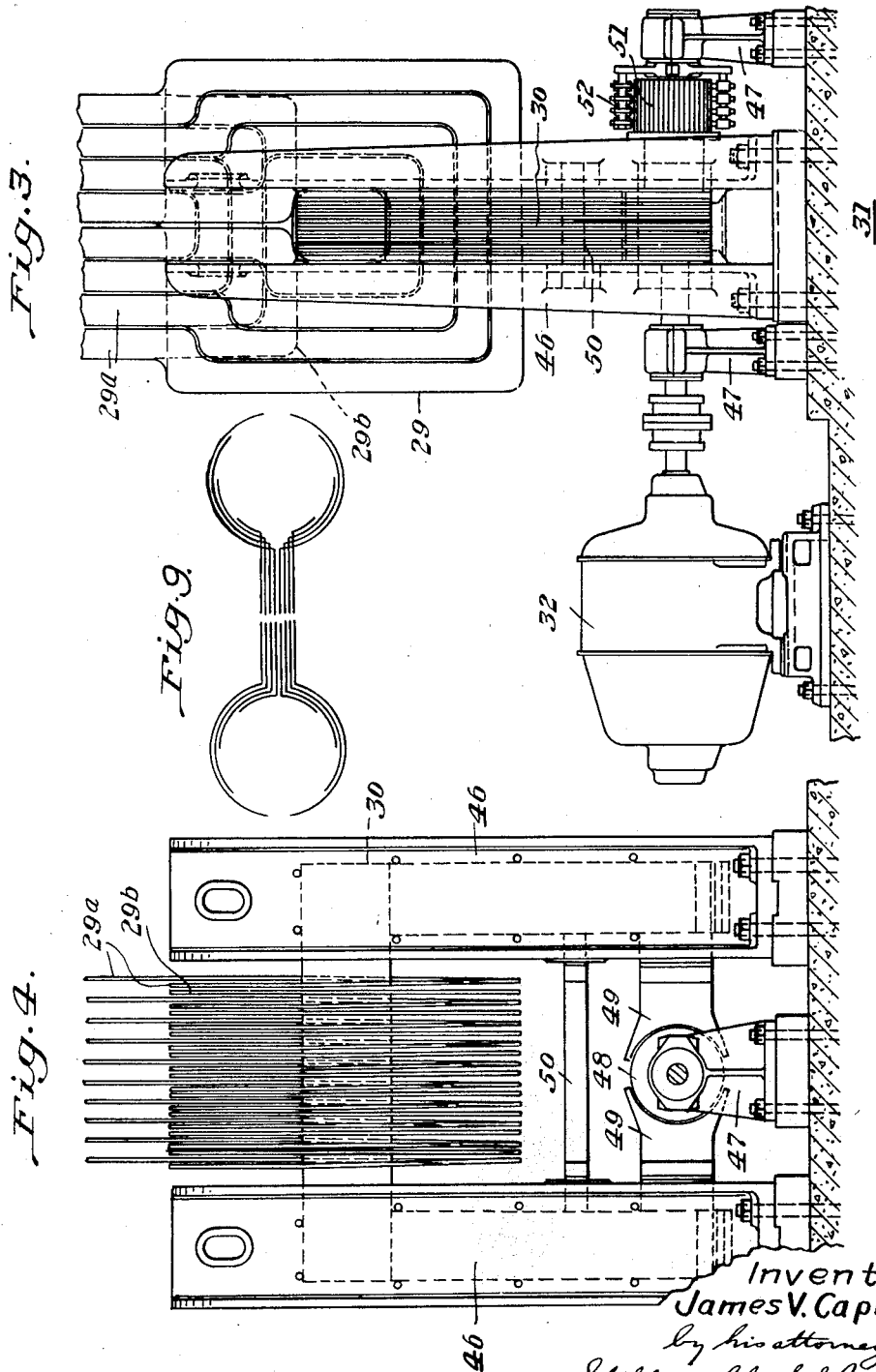

Oct. 17, 1939.  J. V. CAPUTO  2,176,656
METHOD AND APPARATUS FOR WELDING
Original Filed March 14, 1934  4 Sheets-Sheet 3
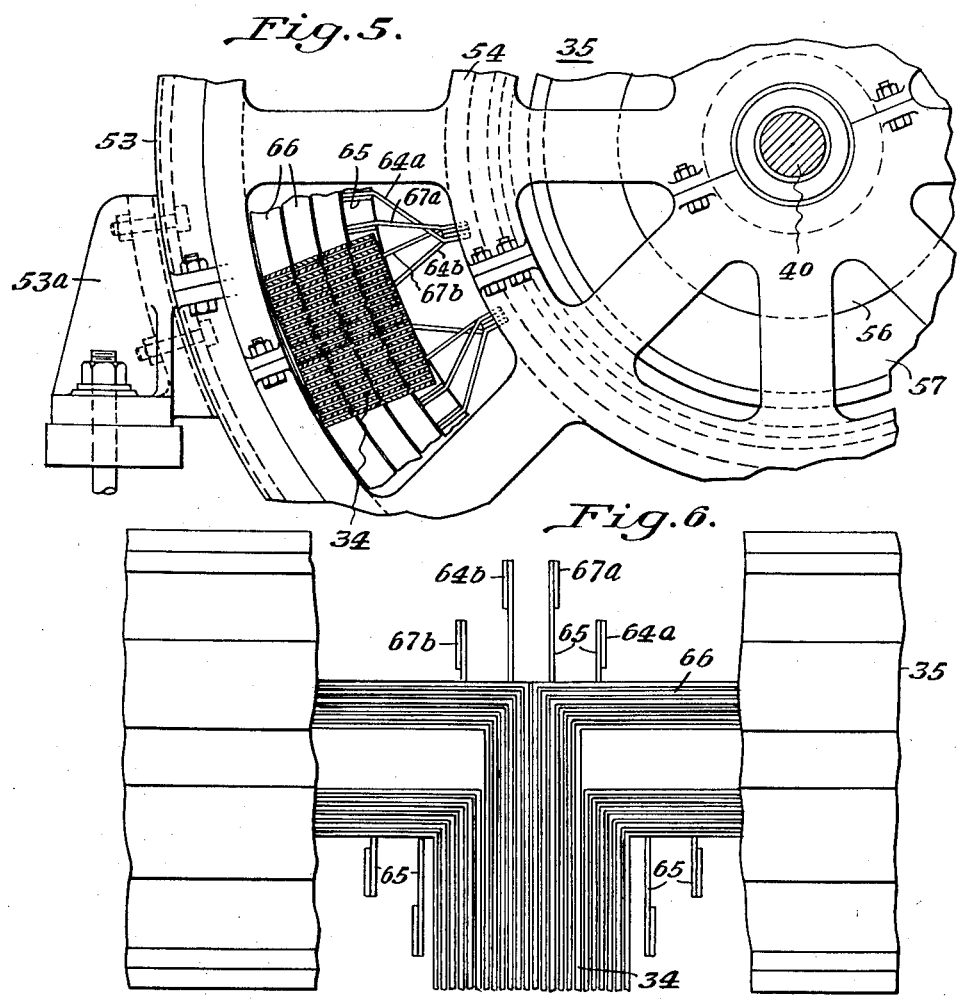
Inventor
James V. Caputo

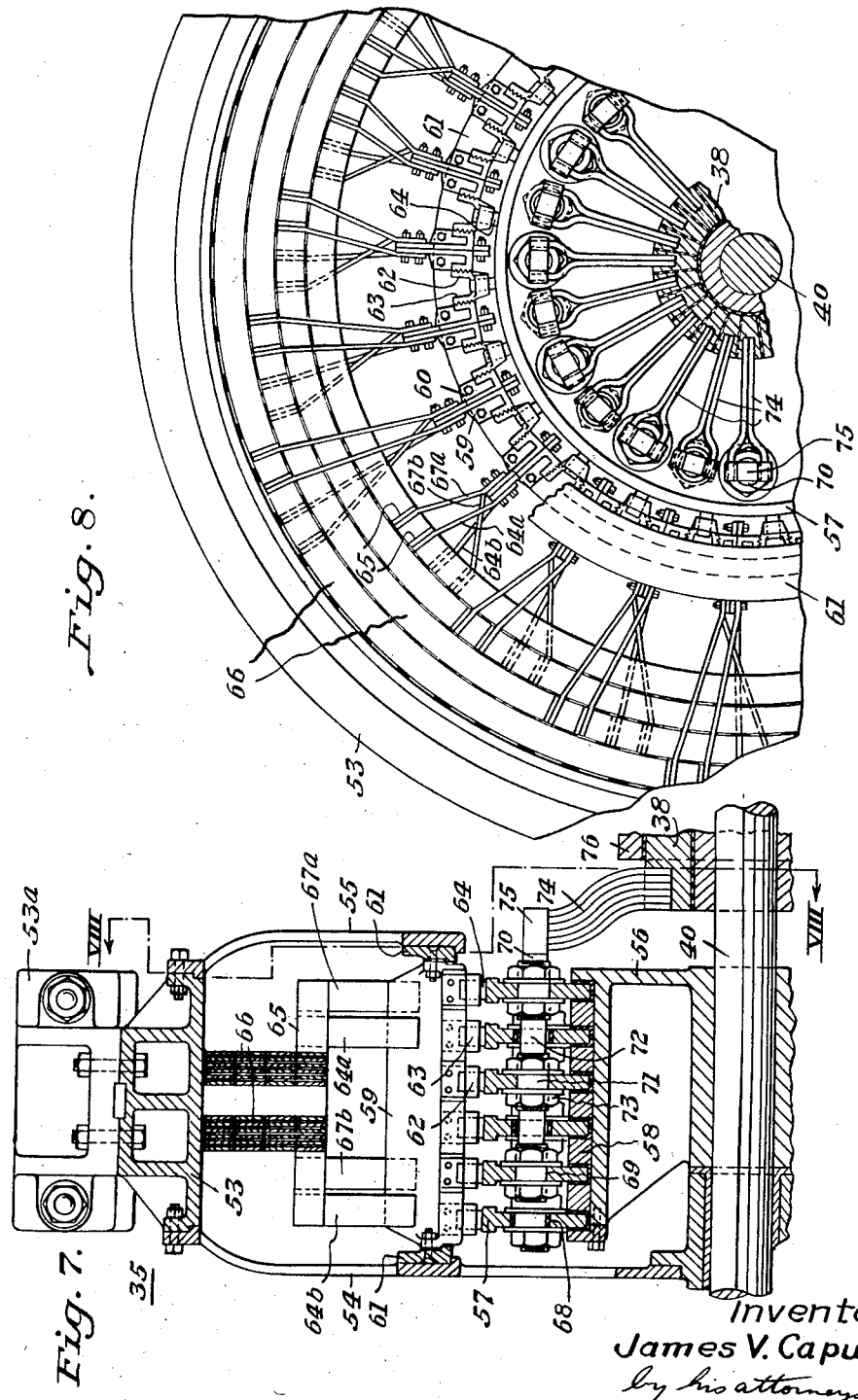

Patented Oct. 17, 1939

2,176,656

UNITED STATES PATENT OFFICE 2,176,656

METHOD AND APPARATUS FOR WELDING

James V. Caputo, Crafton, Pa.

Original application March 14, 1934, Serial No. 715,489. Divided and this application January 16, 1937, Serial No. 120,941

21 Claims. (Cl. 171—97)

My invention relates to the art of electric welding and, in particular, to the continuous welding of seams between abutting plate edges. It is described herein as applied to the welding of axial seam clefts in formed tube blanks, although it is not limited thereto.

The invention described and claimed herein is divided from my Patent No. 2,098,952, dated November 16, 1937, for Method and apparatus for welding.

It is recognized in the electric welding art that direct current is highly desirable for welding because of the uniformity and continuity of the weld produced thereby. Considerable difficulty has been experienced, however, in the generation, transmission and control of direct currents of the magnitude necessary to weld plate edges of substantial thickness at a high rate, for example, currents of the order of hundreds of thousands of amperes. Ordinary commutator types of direct-current generators are, of course, not well suited to the generation of such large currents. The transmission problems are complicated by the necessity for using massive conductors and the fact that a number of parallel circuits of different resistance may exist, giving rise to circulating currents or non-uniform distribution of current in the conductors resulting in excessive heating and losses. The latter seriously affect the generator and may even preclude the satisfactory operation thereof.

The control of large direct currents has also been found difficult especially in the matter of initiating and terminating the flow of such heavy currents as are necessary in welding. The inductance of a circuit adapted for carrying large currents is necessarily considerable, while its resistance must be small unless excessive losses are to be incurred. These conditions, therefore, have necessitated considerable intervals of time for building up and terminating the welding current and have resulted in imperfect welds where the seam impedance varies for any reason. In continuous welding of tubes, for example, the practical success of any particular method or apparatus may be gauged rather well by the amount of end scrap loss, of which a substantial portion is the length which it is necessary to crop from each end of the welded article to remove the incompletely welded portion. It is necessary, furthermore, in contact resistance welding that the work be in engagement with the contact electrode before the welding current begins to flow, to prevent arcing and burning of the electrodes. For the same reason, the current must be terminated before the work leaves the electrode. In order to operate at high speeds, therefore, the welding current must be built up with exceeding rapidity and terminated in a similarly short interval of time when the welding has been completed.

It will be obvious from the foregoing that the requirements of a successful direct-current welder are more or less inconsistent and it has been difficult, impractical, or impossible, to provide equipment which would satisfactorily meet all the necessary requirements.

I have invented a method and apparatus for welding including a direct-current generator and a control and current supply system cooperating therewith, to apply direct current to continuous contact resistance welding of plate edges of substantial thickness at high speeds. The invention provides a satisfactory solution to the problem of generating, transmitting and controlling direct currents of large magnitudes for the purpose of continuous electric welding. The arrangement of the circuit between the generator and the welder is such that circulating currents are practically eliminated and a substantially uniform distribution of current in the various portions of the circuit is obtained. This reduces the heating and losses occurring in the transmission circuit and also makes practical the operation of the generator.

Other features of novelty will become apparent with the progress of the following description, which is to be read in connection with the accompanying drawings illustrating a present preferred embodiment of the invention together with certain modifications thereof. In the drawings:

Figure 1 is a plan view, largely schematic, of the apparatus constituting the welding system of my invention;

Figure 2 is a side elevation corresponding to Figure 1;

Figure 3 is a side elevation of a series or compound exciter for furnishing excitation to the main welding generator;

Figure 4 is an end view corresponding to Figure 3;

Figure 5 is a partial side elevation with parts in section, of a slip ring assembly disposed between the generator and the welder for conducting current from the fixed generator leads to the rotating welding electrode;

Figure 6 is a partial plan view of the slip ring assembly, with parts broken away for clearness;

Figure 7 is a sectional view taken along a radial plane through the axis of the assembly of Figure 5;

Figure 8 is a sectional view along the lines VIII—VIII of Figure 7;

Figure 9 is a schematic diagram of connection of the welding circuit including the internal connection of the welding generator and slip ring assembly.

Referring now in detail to the drawings and, for the moment, to Figures 1 and 2, the invention includes an electric welder 10 having a base 11, columns 12 and a head 13. A carriage 14 is slidably supported on the columns 12 by a fluid suspension 15 and springs 16. The suspension 15 permits lifting the carriage above the limit of movement due to the springs. Screwdowns 17 for adjusting the carriage are driven by a motor 18.

Pressure rolls 19 are adjustably mounted in a base 20, which is itself capable of adjustment on the base 11. A welding electrode 21 is supported in bearings mounted on the carriage 14. The electrode is composed of insulated conducting discs adapted to engage the edges of an axial seam cleft in a formed tube blank shown at 22. The construction of the welder 10 and electrode 21 is more fully explained and claimed in my Patent No. 2,006,912.

A plurality of conductors extend axially from the electrode 21 through one of its supporting bearings 23. Alternate conductors engage opposite discs of the electrode and are insulated from the other disc.

Welding current is supplied to the electrode 21 through the aforementioned conductors from a generator 24. This generator is preferably of the homopolar type, as described and claimed in my Patent No. 2,005,609. The generator terminals are shown at 25 and 26 and each comprises a plurality of conducting bars of opposite polarity in interleaved relation. As shown in Figure 1, the individual conductors of the terminals 25 and 26 are interleaved and are fanned out a short distance from the generator. This permits the dimensions of the slip ring assembly to be kept to a minimum. By reason of the interleaving, adjacent bars are of opposite polarity, the conductors of one polarity being sandwiched in between those of the other polarity. Flexible connectors 27 join the bars of the terminals 25 and 26 to a plurality of bars 28 having a loop 29 formed therein. The loop 29 links the core 30 of a series compound exciter 31 driven by a motor 32, which will be explained more fully later.

Flexible connections 33 similar to those shown at 27 join the bars 28 to similar bars 34 entering a device 35, which I designate as a slip ring assembly, since it receives current from the stationary conducting bars 34 and delivers it to a rotating system including the electrode 21. The bars forming the terminals 25 and 26, and the bars 28 and 34 are firmly held together in proper relative position by clamps 36 having bolts 37 extending therebetween.

The slip ring assembly 35, which will be described in greater detail presently, delivers current to rotating conductors 38 rotatably supported in bearings 39. The conductors 38 and the slip rings of the assembly 35 are carried on a shaft 40. The shaft 40 is driven by a motor 40m through gearing 40j. A shaft 41 on which the electrode 21 and its supply conductors are supported, is coupled to the shaft 40 through universal joints 42 and a connecting shaft 43. The joints 42 permit the welder axis to be disposed offcenter with regard to the slip ring assembly axis, if desired. Connectors 44 extend between radial projections 45 on the conductors 38 and on those extending from the electrode 21.

Referring now to Figures 3 and 4, the exciter 31, in addition to the windings 29 and core 30, comprises a frame 46, bearings 47 and an armature 48 rotatably supported thereon between pole pieces 49. A saturation bridge 50, which is simply a magnetic bar, extends between opposite legs of the rectangular core and is adjustable relative thereto to vary the amount of flux passing from one pole piece 49 to the other. Bars of different cross-sectional area will also be used to permit further control of the flux.

It will be apparent from Figures 3 and 4 that the bars 29a connected to the terminal 25, for example, extend around the horizontal portion of the core 30 in one direction, while the adjacent bars 29b connected to the other terminal 26, extend across the top of the core and around it in the opposite direction. In this way, both sides of the main circuit, that is, the conductor bars 29 of opposite polarity, are given substantially the same length and impedance, and a single-turn winding is provided for the core 30. The driving motor 32 requires no description since it may be of any desired adjustable-speed type, effective to drive the exciter armature 48 at a substantially constant speed when once adjusted. With the bars 29a and 29b disposed as described, the resulting magnetomotive force is in one direction only and the flux induced in the core 30 depends on the current traversing the bars. It will be apparent that by disposing certain bars of opposite polarity in the same direction about the core, their magnetomotive forces will be differential and they will contribute nothing to the excitation of the core. In this way, the desired excitation of the core for full welding current may be obtained. Further adjustment, of course, can be made by moving the saturation bridge 50, the position, area, and saturation of which determines the proportion of the core flux which is bypassed around the pole pieces 49. The exciter 31 is obviously a two-pole machine and its output is collected from a commutator 51 by brushes 52 in the usual manner.

Referring now to Figures 5 through 8, the slip ring assembly 35 comprises an annular yoke 53 having end bells 54 and 55 attached thereto. The yoke 53 is supported on feet 53a but may be rotated thereon to position the slip ring assembly at any desired angle relative to the shaft of the generator 24. The shaft 40 extends through the end bells coaxially of the yoke 53 and is provided with a spider 56. A plurality of slip rings 57 are carried on the spider 56 but insulated therefrom and separated by spacers 58.

Brush holder brackets 59 and 60 disposed back to back, are secured to but insulated from rings 61 carried by the end bells 54 and 55. The brackets 59 and 60 are separated by a thin layer of insulating material since they are connected to bars 34 of opposite polarity through connections which will soon be described. All the brackets 59 are of the same polarity and likewise all the brackets 60 and, therefore, the bracket 59 of one pair is of a polarity opposite that of the bracket 60 which it faces in the adjacent pair. Brush holders 62 and 63, having brushes 64 carried thereby, are secured to the brackets 59 and 60, respectively, of adjacent pairs. The brushes 64 on the holder 62 project between the brushes on the holder 63 and engage alternate slip rings 57 of opposite polarity. The engaging faces of the holders and brackets are serrated. The connecting bolts are not shown.

Risers 64a and 64b are connected to one of the brackets 59. The upper ends of these risers are attached to the outturned ends 65 of annular conducting bars 66, all the annular bars being interleaved and insulated so that adjacent bars are of opposite polarity. The outcoming leads from the generator are arranged similarly to the annular bars 66, as shown and claimed in my Patent No. 2,005,609 and, in order to provide equal impedance in all the parallel paths between the generator and the welder, I connect the short leads 66 to the long leads in the generator, and vice versa, as shown diagrammatically in Figure 9. It will be apparent that the lengths of the different leads 66 vary depending on where they are connected to the brush holder brackets. Risers 67a and 67b similarly extend from the brackets 60 to the outturned ends of the annular bars 66.

The annular bars 66, as shown in Figure 6, are continuations of the bars 34, are supported in the yoke 53, and are insulated therefrom and from each other. The brackets 59 and 60 are insulated from the ring 61 and the bolts extending through the pairs of brackets and the risers connected thereto are insulated from both these elements. There is electrical engagement, of course, between each bracket and the risers extending therefrom.

Each of the slip rings 57 has a row of peripheral holes alternately of different diameter, and adjacent rings are disposed so that their peripheral holes of different diameters are in alinement. In Figure 7, the left-hand ring has a plurality of large holes 68 therein. The next slip ring also has a plurality of large holes but between them, a series of smaller holes 69, the holes 69 of the second ring being in line with the holes 68 of the first ring. Bars 70 extend through the alined holes and slip rings and have enlarged portions 71 fitting tightly in the smaller holes and reduced portions 72 which pass through the large holes 68 with clearance. Insulating bushings are also disposed in the holes 68. Clamping nuts 73 threaded on intermediate portions of the bars 70 provide a good electrical connection between the bars and the alternate rings which they engage. It will be apparent that each bar 70 engages only alternate rings and that the next successive bar engages the other rings.

Flexible connections 74 extend from terminal blocks 75 on the bars 70 to the insulated conducting segments 38 extending axially of the shaft 40. A split ring 76 embraces the bars 38 and is insulated therefrom. The ring 76 is rotatably supported in one of the bearings 39. A similar ring 76 cooperates with the other bearing.

The radial projections 45 are similar to the connections 74 but are not flexible. The flexibility required between the shaft 40 and the shaft 43 is provided by the connectors 44. The conductors extending axially from the electrode 21 are similar to the bars 38 and pass through the left-hand electrode bearing in the manner described in connection with the bearings 39.

It will be apparent that my invention is characterized by numerous advantages. In the first place, I have provided a simple apparatus for generating and transmitting direct current of the magnitude necessary for welding, characterized by ready accessibility to all parts for inspection or renewal. The various parallel circuits between the generator and the welder have substantially the same impedance, so there are no excessive circulating currents and the distribution of current in each conductor is substantially uniform. The entire slip ring assembly may be rotated on its supporting feet and can thus be accommodated to any particular location of the generator leads relative thereto and regardless of any difference in elevation between the generator and welder. The flexible connections between the welder and the current supply means permit considerable latitude in the location of both elements.

The series exciter provides compound characteristics for the main generator in a very simple manner and the degree of compounding may be readily adjusted to suit the various conditions by means of the saturation bridge and the disposition of the conductors of the exciting winding. The exciter driving motor, being adjustable for various speeds, provides further flexibility of control for the main generator excitation. The building up of the welding current and the determination thereof may thus be accomplished with great rapidity. The interleaving of the main conductors decreases the inductance of the circuit and further reduces the time characteristic thereof.

While I have illustrated and described herein but one preferred embodiment of the invention with certain modifications, it will be apparent that numerous changes in the construction described and illustrated may be made without departing from the scope of the appended claims.

I claim:

1. The combination with a heavy-current load, of a generator for supplying current thereto and a slip ring assembly for transmitting current from the generator to the load, connections between the generator and assembly including conductors extending different distances circumferentially of the generator and assembly, the leads extending the farthest distance about one of said units being connected to the leads extending the shortest distance about the other, to equalize the impedance of the several connections.

2. In a supply system for a heavy-current load, a generator, and a slip ring assembly between it and said load including an annular support, brushes carried thereby, a shaft extending axially of said support, rings on said shaft engaging said brushes, and interconnecting means extending axially through said rings, having electric conducting engagement with alternate rings.

3. In a supply system for a heavy-current load, a generator for supplying current thereto and a slip ring assembly between the generator and load, comprising an annular supporting structure, conductors extending circumferentially therein, brush-holder brackets carried on said structure in pairs, oppositely disposed and insulated from each other, and means connecting said brackets respectively to certain of said conductors of opposite polarity.

4. The combination with a generator, a load, and conductors extending therebetween, of a slip ring and brush assembly therebetween to which said conductors are connected, adjacent rings of said assembly being connected to conductors of opposite polarities.

5. In a current supply system for a heavy-current load, the combination with conductors extending from the load spaced about a common axis, a generator for supplying current to said conductors, a slip ring assembly between the generator and said conductors, an exciter for said generator, said exciter having a core and being disposed between the generator and assembly, and conductors extending from the generator to the assembly, said conductors being in inductive relation with the core of said exciter.

6. The combination with a heavy-current load and a generator for supplying current thereto, of a slip ring assembly having relatively fixed brushes connected to the generator and conducting rings connected to the load, said assembly including an annular structure surrounding said rings and supporting said brushes, and means supporting said structure for rotary adjustment.

7. In a current supply system, a load, a heavy-current generator adjacent thereto having supply leads of opposite polarity extending therefrom toward the load, and an exciter for the generator disposed between the generator and load, said exciter having a core, and said leads of opposite polarity being disposed in inductive relation to said core to produce magnetization of the core in the same direction.

8. The combination with a heavy-current load and a supply generator adjacent thereto, of a slip ring assembly for transmitting current from the generator to the load, said assembly comprising a support, brushes carried thereby, slip rings rotatable within said support and having sliding engagement with said brushes, conductors connected to said brushes, said conductors extending circumferentially of said support and then in an axial direction therefrom adjacent a common point to said generator, and other conductors extending axially from said rings to said load.

9. The combination with a current-consuming device and means mounting it for rotation, of a fixed heavy current generator adjacent the load, interleaved conductors extending from said generator to said load, and a dynamo-electric machine having its field structure adjacent said conductors for controlling the excitation of the generator to vary the current supplied to the load.

10. The combination with a current-consuming device and means mounting it for rotation, of a fixed heavy current generator adjacent the load, interleaved conductors extending from said generator to said load, and an exciter for said generator having a magnetic circuit in inductive relation with said conductors so as to be excited thereby.

11. The combination with a current-consuming device and means mounting it for rotation, of a fixed heavy current generator adjacent the load, interleaved conductors extending from said generator to said load, and an exciter for said generator having a magnetic circuit in inductive relation to said conductors so as to be excited thereby, conductors of opposite polarity being associated with said circuit in opposite senses.

12. The combination with a generator and a load supplied thereby, of a series exciter for said generator including a field structure and an armature, and adjustable means for bypassing around said armature a portion of the flux traversing said structure whereby to control the excitation of said exciter.

13. The combination with a generator, a load, and conductors extending therebetween, of a slip ring and brush assembly therebetween to which said conductors are connected, the conductors connected to said brushes being curved and extending circumferentially about said assembly substantially to a common point, and conductors of opposite polarities being interleaved.

14. In a current supply system for a heavy-current load, the combination with a plurality of conductors extending from the load in spaced relation circumferentially of a common axis, and a generator adjacent the load, of leads extending from the generator in closely grouped relation, a slip ring assembly between the generator and load, the load conductors having electrical engagement with the rings of said assembly, and connections from the generator leads extending circumferentially of the rings to brushes engaging said rings.

15. The combination with a current-consuming device, means mounting said device for rotation, a heavy-current generator adjacent said device for supplying curent thereto, a slip-ring and brush assembly disposed between said generator and said device, a group of conductors extending from said assembly to terminals of both polarities on said generator, and a group of conductors of both polarities extending from said assembly to said device, the conductors of opposite polarities of both said groups being interleaved.

16. The combination with a current-consuming device, means mounting said device for rotation, a heavy-current generator adjacent said device for supplying current thereto, a slip-ring and brush assembly on one side of and spaced laterally from said device, a group of conductors extending from said assembly to terminals of both polarities on said generator, and a group of conductors of both polarities extending from said assembly to said device, the conductors of opposite polarities of both said groups being interleaved.

17. The combination with a current-consuming device and means mounting it for rotation, of a fixed heavy-current generator adjacent the load, conductors extending from said generator to said load, a slip ring and brush assembly interposed between said generator and load, the conductors extending from said generator and load being connected to the rings or brushes of said assembly, a shaft mounting said rings and means for driving said shaft to rotate said device.

18. The combination with a current-consuming device, means mounting said device for rotation, a heavy-current generator adjacent said device for supplying current thereto, a slip-ring and brush assembly having conductors extending to said device and generator, certain of said conductors extending substantially axially from said assembly and others substantially from the circumference thereof, and means mounting the relatively fixed portion of said assembly for rotation whereby to vary the position of the point at which said others extend therefrom.

19. The combination with a heavy-current load device and a slip-ring and brush assembly connected thereto, of a heavy-current generator disposed adjacent said assembly, and a plurality of conductors of both polarities extending radially from said generator, the conductors of both polarities being interleaved between said generator and assembly.

20. The combination with a heavy-current load device and a slip-ring and brush assembly connected thereto, of a heavy-current generator disposed adjacent said assembly, a plurality of conductors of both polarities extending radially from said generator, the conductors of both polarities being interleaved between said generator and assembly, and means mounting said assembly for adjusting movement relative to said conductors.

21. The combination with a heavy-current load device and a slip-ring and brush assembly connected thereto, of a heavy-current generator disposed adjacent said assembly, a plurality of conductors of both polarities extending radially from said generator, the conductors of both polarities being interleaved between said generator and assembly, and the connections from the assembly to the device being arranged and constructed so that the device may be adjusted relative to said assembly.

JAMES V. CAPUTO.